June 26, 1928.　1,675,217

C. HEUZE
PROCESS AND APPARATUS FOR THE CONTINUOUS MANUFACTURE
OF PLATE GLASS OR SHEETS OF GLASS
Filed May 1, 1926　　4 Sheets-Sheet 1

C. Heuze
inventor

By: Marks & Clerk
Attys

June 26, 1928.
C. HEUZE
1,675,217
PROCESS AND APPARATUS FOR THE CONTINUOUS MANUFACTURE
OF PLATE GLASS OR SHEETS OF GLASS
Filed May 1, 1926 4 Sheets-Sheet 2
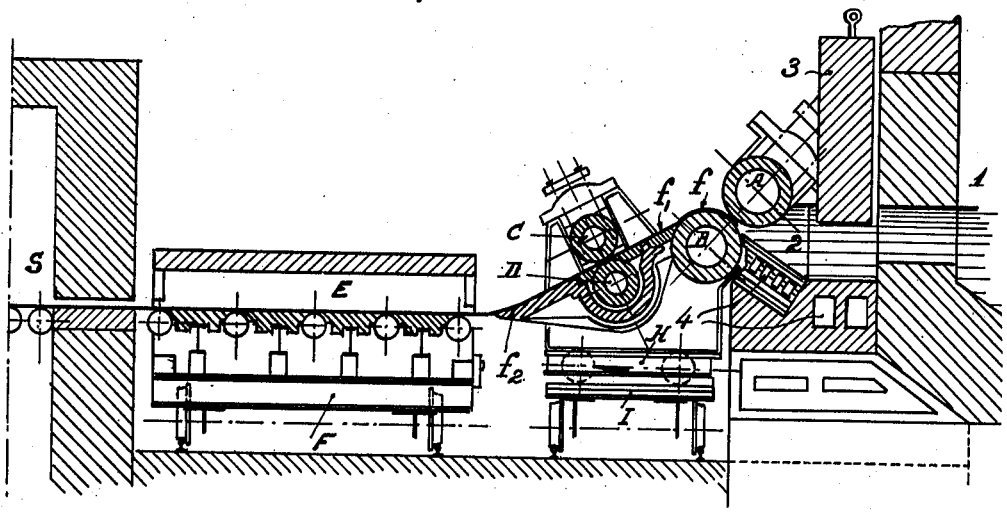
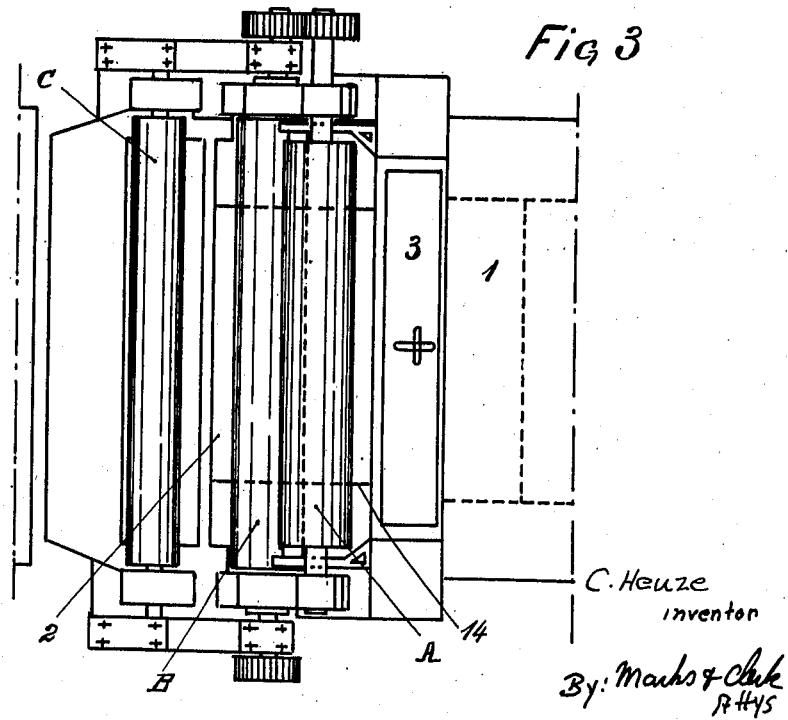

June 26, 1928.

C. HEUZE 1,675,217

PROCESS AND APPARATUS FOR THE CONTINUOUS MANUFACTURE
OF PLATE GLASS OR SHEETS OF GLASS

Filed May 1, 1926     4 Sheets-Sheet 3

C. Heuze
Inventor

By: Marks & Clerk
Atty

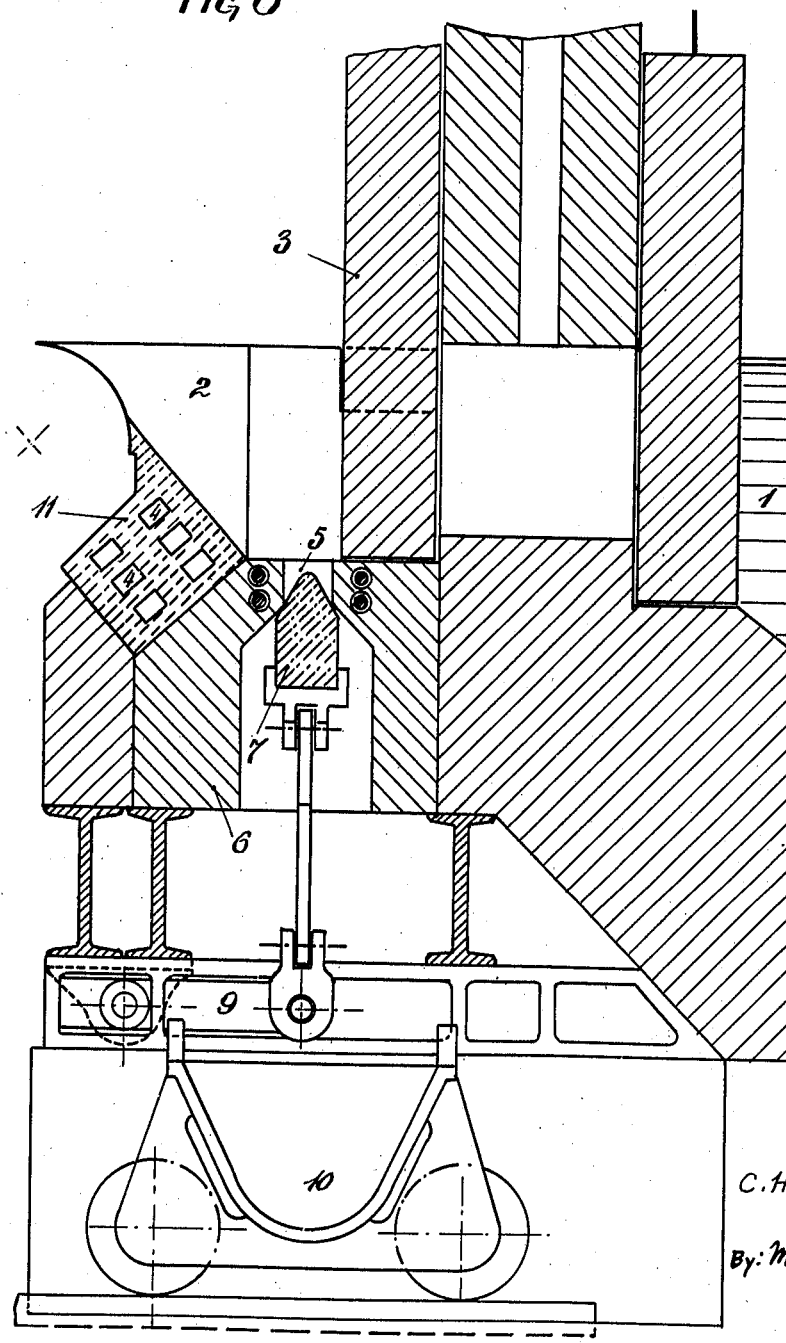

Patented June 26, 1928.

1,675,217

UNITED STATES PATENT OFFICE.

CHARLES HEUZE, OF AUVELAIS, BELGIUM.

PROCESS AND APPARATUS FOR THE CONTINUOUS MANUFACTURE OF PLATE GLASS OR SHEETS OF GLASS.

Application filed May 1, 1926, Serial No. 106,026, and in Belgium March 5, 1926.

The present invention relates to the manufacture of sheets of glass or of plate glass by the process known as continuous pouring process.

In the application of this process, up to the present, the supply of the glass was made onto an inclined table which in turn presents the rough product to the rolling or calibrating cylinders, or else directly to rolling cylinders located in the neighborhood of the pouring lip, but in any case under the direct control of the flow from the said lip, that is to say that the glass feed was directly affected by the variations in the said flow, and at the same time by the variable conditions in the melting furnace.

Another result is that the rate of production must be maintained between certain limits and particularly above a certain rather high minimum rate, below which the state of fluidity of the glass may become such as to prevent its rolling.

Under these conditions, aside from the large size of the manufacturing apparatus proper, which generally necessitates that the latter be stationary and consequently such that a shut down of a single part of the apparatus will stop the manufacture, the high rates of production lead to the use of extensive installations, the whole affecting unfavorably the manufacturing costs.

The purpose of the present invention is to do away with the various drawbacks above pointed out, by modifying both the process and the apparatus, in such a way that the supply of glass and the rate of formation of the sheet are made essentially independent of the flow from the pouring lip as well as of the prevailing conditions in the furnace, while as a consequence enabling the size of the installations to be reduced and the effects of trouble with the manufacturing apparatus to be attenuated if not entirely avoided.

To his effect, the invention consists:

In no longer allowing the glass to flow to the rolling cylinders but in causing said glass to spout under pressure, the feed pressure being moreover adjustable as desired;

In providing for feeding the rolling cylinders a bulk of glass separate from that contained in the melting furnace, thus allowing its temperature and composition to be adjusted as desired;

In combining the feeding devices as well as the rolling and calibrating apparatus in such an arrangement as to provide for easy inspection and replacement of a rolling machine if this becomes necessary.

The invention includes the particular process, the devices, apparatus and arrangements enabling the above objects to be attained and especially:

The rolling apparatus comprising, for example, a pair of cylinders designed and arranged so that they can be applied to and caused to penetrate as far as required into a mass of molten glass, so as to obtain between the cylinders the formation of a sheet or plate feed under pressure, said pressure being adjustable as desired by modifying the position of the cylinder group relative to the mass of glass;

In combination with a glass melting furnace, a sort of trough or receiver suitable for receiving a bulk of glass feeding the aforesaid rolling apparatus, said trough being in turn combined with means enabling the conditions of the bulk of glass to be easily regulated or modified.

Aside from the above main arrangements, the invention also includes certain other special arrangements preferably employed at the same time and more fully explained in the following complementary description of a preferred embodiment, given as example only and illustrated in the accompanying drawings, in which:

Fig. 2 is a view, partly in section, showing the general arrangement of a rolling installation.

Fig. 3 is a partial plan view of the same arrangement;

Figs. 5 and 6 are detail views of certain parts of the combination, drawn to a larger scale.

Figure 1:
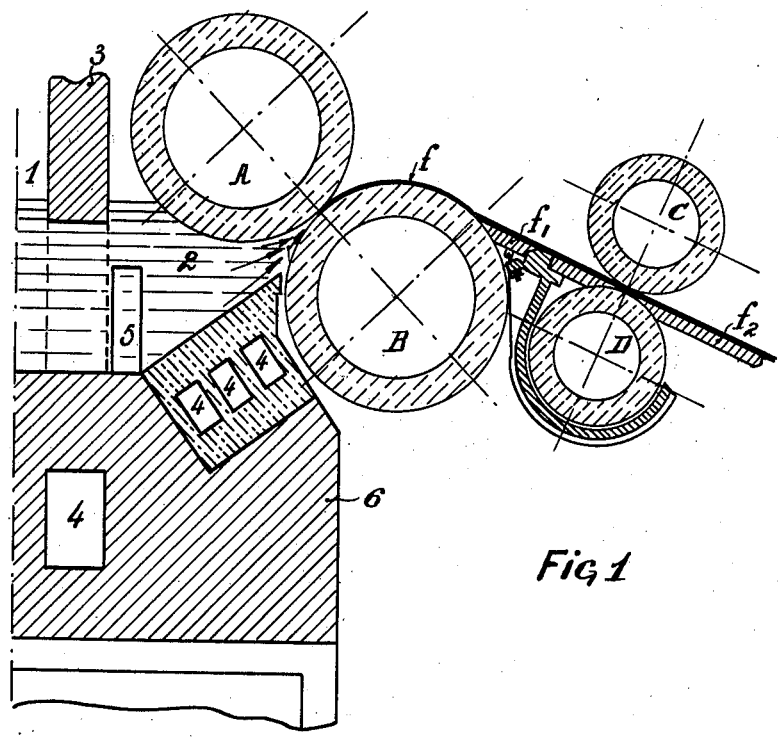
Fig. 1 is a diagram showing an arrangement of the principle enabling the process of the invention to be caried into practice.

As above stated, and as it will be seen from the inspection of Fig. 1, supposing that it is desired to produce a sheet or plate glass by the process according to the invention, a sort of trough or receiver 2 is placed or built even with the pouring opening of a melting furnace 1, arranged so as to enable the opening passage to be adjusted as desired as by a gate 3 and the temperature of the contents of the trough to be regulated by providing a suitable circulation in the ducts such as 4, formed in the walls of the trough.

A rolling cylinder B is mounted before the front lip of the trough 2 and another cylinder A, cooperating with the cylinder B, is disposed above the latter and journaled in a frame tiltably supported on the shaft of the cylinder B. It follows that if the level of the glass in the trough and the inclination of the cylinder frame as well as the distance between the cylinders A and B are suitably adjusted, the formation of a sheet or plate of glass $f$ will be obtained, fed by spouting under a desired pressure. The sheet of glass $f$ will be carried along at the the rotary speed of the rolling cylinders and particularly at the speed of the cylinder B, which speed can be as low or as high as desired.

Beyond the cylinder B the glass sheet or plate formed is separated from the cylinder and carried onto a guide table $f^1$ so as to pass between calibrating cylinders, or fluted cylinders if special glass is to be manufactured.

The cylinders C and D, as well as the cylinders A and B, can be provided with a circulating system for maintaining or modifying their temperature.

It will be readily noted that in addition to the above results, the arrangement enables the width of the sheet or plate glass formed to be varied at will. To this effect, it is only necessary, for example, to provide an upper cylinder A of suitable length or to partition the trough 2, or to combine these two means.

In a practical form of construction, as represented by Figs. 2 and 3, the frame supporting the rolling cylinders A and B, as well as that supporting the calibrating or finishing cylinders C and D, together with the guide platens $f_1$ and $f_2$, are mounted on a truck H which can be moved towards or away from the trough 2, and the said truck H is in turn placed on a truck I which can be moved transversely, that is to say can be removed laterally or put into correct position in front of the furnace.

Obviously this enables the rolling apparatus to be easily replaced or carefully adjusted in operative position in front of the supply trough.

The sheet of glass or plate glass formed, after having passed between the calibrating or finishing rolls, follows the platen $f_2$ which curves it into horizontal position and enters a tunnel E provided with rollers or other mechanical moving means. The said tunnel E is mounted on a truck and used as connecting means between the rolling machine and the annealing apparatus S, this enabling the space in front of the melting furnace to be cleared if required.

In the annealing apparatus the sheet of glass is received onto a conveyor or the like, and on account of the diminished rate of production the size of said apparatus can be reduced to the normal proportions.

Figure 4:
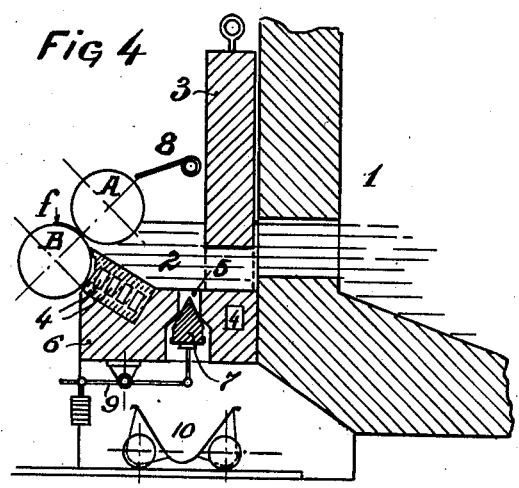
Fig. 4 is a diagrammatical view of a similar arrangement comprising a few modifications.

As illustrated in Fig. 4, a screen 8 can be provided above the trough 2 in order to prevent radiation.

In this figure also, the discharge opening 5 instead of being at the side of the trough as in Fig. 1, is formed in the bottom 6 of the latter and closed by means of a plunger 7 operated by means of a counterweighted lever 9. A passage is provided underneath the trough enabling the ladle 10 to be introduced for receiving the glass when the trough is being emptied.

The arrangement is shown to a larger scale in Fig. 6, in which the shape given to the sill 11 of the trough 2 can also be noted, the said sill being preferably formed by a separate metallic or refractory member provided with ducts for the circulating system.

Figure 5:
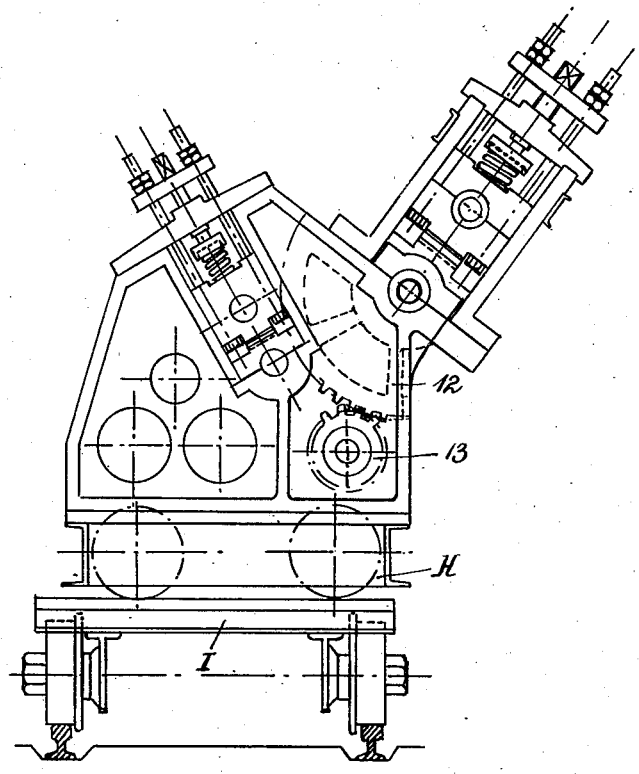

The details of construction of the rolling machine and of the operating mechanism of the cylinder frame are shown in Fig. 5. The supporting members of said cylinders are moved by means of toothed sectors 12 in engagement with pinions 13 mounted on a common shaft, the latter being rotated by any suitable means.

As will be seen more clearly in Fig. 3, the supporting members and operating mechanism rotating the rolling cylinders are situated at the sides and outside the walls of the trough 2, the working length of which can be reduced if desired by means of suitable partitions such as 14.

The parts being properly built, and a cylinder A of suitable length being mounted or partitions 14 spaced suitably for the width of glass it is desired to manufacture, glass from the furnace 1 is admitted into the trough 2 by raising the gate 3 to the necessary extent; the rolling machine being in place in front of the said trough.

The inclination of the supporting members of the cylinders A and B, that is to say the penetration of the said cylinders into the mass of molten glass, as well as the distance between them, being selected and suitably adjusted for the thickness of the glass to be manufactured, the rolling cylinders are rotated, for example by an electric motor mounted on the truck H, and the sheet of glass from between the cylinders A and B is conducted by the lower cylinder until it is taken onto the platen $f_1$, calibrated or impressed by the cylinders C and D and carried to the annealing apparatus as above explained.

It will be understood that the invention is not limited to the process and constructive arrangements more specially considered, but that it also includes the alternatives and the modifications to same.

Claims—

1. A process of manufacturing sheet or plate glass consisting in storing a mass of molten glass in a trough or receiver and causing said molten glass to flow up under pressure between rolling cylinders.

2. A process of manufacturing sheet or plate glass, consisting in storing a mass of molten glass in a trough or receiver and causing said molten glass to flow up under pressure between variably tilted rolling cylinders, whereby the speed of manufacture may be varied at will.

3. A process of manufacturing sheet or plate glass consisting in continuously storing a mass of molten glass in a trough or receiver, causing said molten glass to flow up under pressure in the form of a sheet or plate between inclined rolling cylinders and subsequently subjecting said sheet or plate to the action of finishing rolls.

4. A process of manufacturing sheet or plate glass consisting in forming molten glass in a melting furnace, leading the molten glass in a trough or receiver, causing it to flow up through the adjustable slit between tilted rolling cylinders so as to spout therefrom in the form of sheet and simultaneously rolling said sheet, receiving the rolled sheet on an inclined platen and subjecting it to the action of finishing rolls.

5. A process of manufacturing sheet or plate glass consisting in forming molten glass in a melting furnace, continuously storing the molten galss in a trough or receiver so as to raise its level above an inclined forming and adjustable slit between rolling cylinders and obtain the spouting of the glass therefrom in the form of a rolled sheet, receiving the sheet on an inclined platen and subjecting it to the action of finishing rolls on its way to annealing apparatus.

6. Apparatus for manufacturing sheet or plate glass by the method known as "continuous pouring process" comprising in combination a trough or receiver communicating with a melting furnace, tiltable rolling cylinders arranged with the slit therebetween on an inclined position in the trough, means to cause the cylinders to partially enter a mass of glass in the trough and to control the advance of said cylinders in said glass, independent means to vary the width of the slit between the cylinders and means to rotate said cylinders.

7. Apparatus for manufacturing sheet or plate glass by the method known as "continuous pouring process" comprising in combination a melting furnace, a trough or receiver communicating therewith through an adjustable opening, tiltable rolling cylinders arranged in relation with the trough so that the adjustable slit between the cylinders enters the glass in the trough, means to move the slit in controlled inclined position below the level of a mass of glass contained in the trough and means to rotate said cylinders.

8. Apparatus for manufacturing sheet or plate glass by the method known as "continuous pouring process", comprising in combination: a melting furnace, a trough or receiver communicating therewith below the level of the molten glass and means to control the communication, an inclined wall of reduced height on the trough, a pair of rolling cylinders, one cylinder in front and closely adjacent the inclined wall with its upper side slightly above the upper edge thereof and the other cylinder tiltable about the axis of the former and entering the trough, means to control the advance of the second cylinder into the trough, independent means to control the width of the slit and means to rotate the cylinders.

9. In apparatus for manufacturing sheet or plate glass by the method known as "continuous pouring process", a melting furnace, a trough or receiver, means for feeding the trough with the melted glass of the furnace and means for partially or entirely emptying said trough, an inclined wall of reduced height on the trough, tiltably rolling cylinders in front of said wall with an adjustable slit therebetween in an inclined position and submerged by the glass to cause same to spout therefrom in the form of a sheet, means to control the pressure of the glass on the slit, and means to rotate said cylinders.

10. In apparatus for manufacturing sheet or plate glass, a melting furnace, a trough or receiver in communication therewith, inclined rolling cylinders adapted to partially enter said trough, one of the cylinders being of a length different from that of the other.

11. Apparatus for manufacturing sheet or plate glass by the method known as "continuous pouring process", comprising in combination: a melting furnace, a trough or receiver in communication therewith through an adjustable opening, means for partially or entirely emptying said trough, and a rolling machine in front of the trough, the rolling cylinders of which are tiltably mounted and able to penetrate partially inside the trough.

12. A rolling machine comprising the combination of adjacent rolling cylinders rotating in tiltable bearings pivotally mounted about the shaft of one of said cylinders, a straight guide platen for receiving the sheet of glass at the delivery side of the rolling cylinders, a pair of finishing rolls following the platen and a guide platen located beyond the finishing rolls.

13. A rolling machine comprising a pair of adjacent rolling cylinders, rotating in tiltable bearings pivotally mounted about the shaft of one of them, one of the cylinders of a length different to that of the other, a straight guide platen at the delivery side of the rolling cylinders, a pair of finishing rolls located at the end of the guide platen and adapted to receive the sheet between them, and a guide platen located beyond the finishing rolls.

14. Apparatus for manufacturing sheet or plate glass by the method known as "continuous pouring process", comprising in combination a melting furnace, a trough or receiver in communication therewith through an adjustable opening, means to control the level of the molten glass in the trough, a rolling machine, said machine having rolling cylinders rotating in bearings tiltable about a common shaft to cause the cylinders to partially enter the trough, means to vary the distance between the cylinders, a guide platen, finishing rolls adjacent said platen and a second platen beyond said rolls, an annealing apparatus, and a movable tunnel between said rolling machine and said annealing apparatus, and means inside said tunnel for mechanically conveying the sheet of glass, and means inside the said tunnel for mechanically conveying the sheet of glass.

CHARLES HEUZE.